United States Patent Office 3,384,209
Patented May 21, 1968

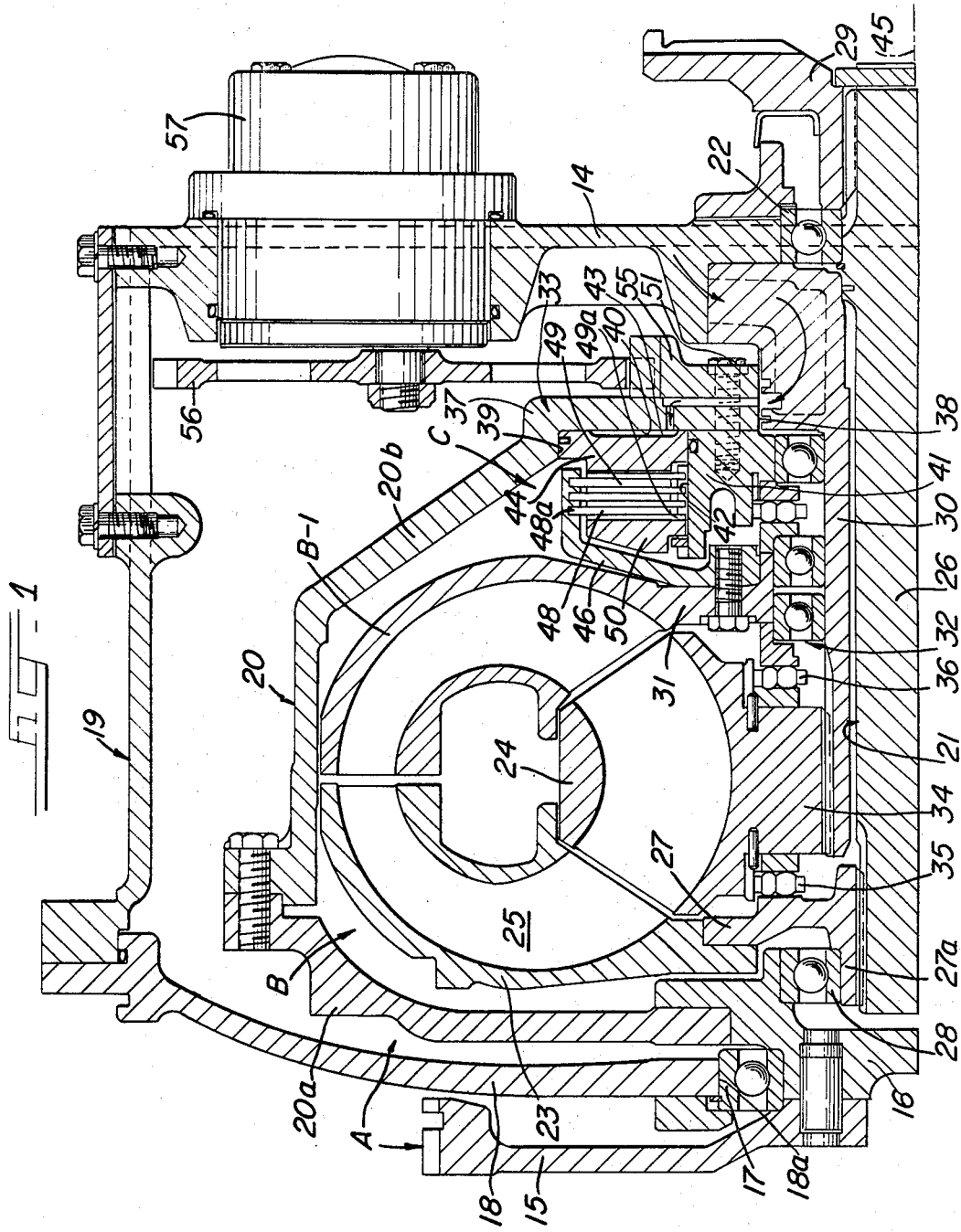

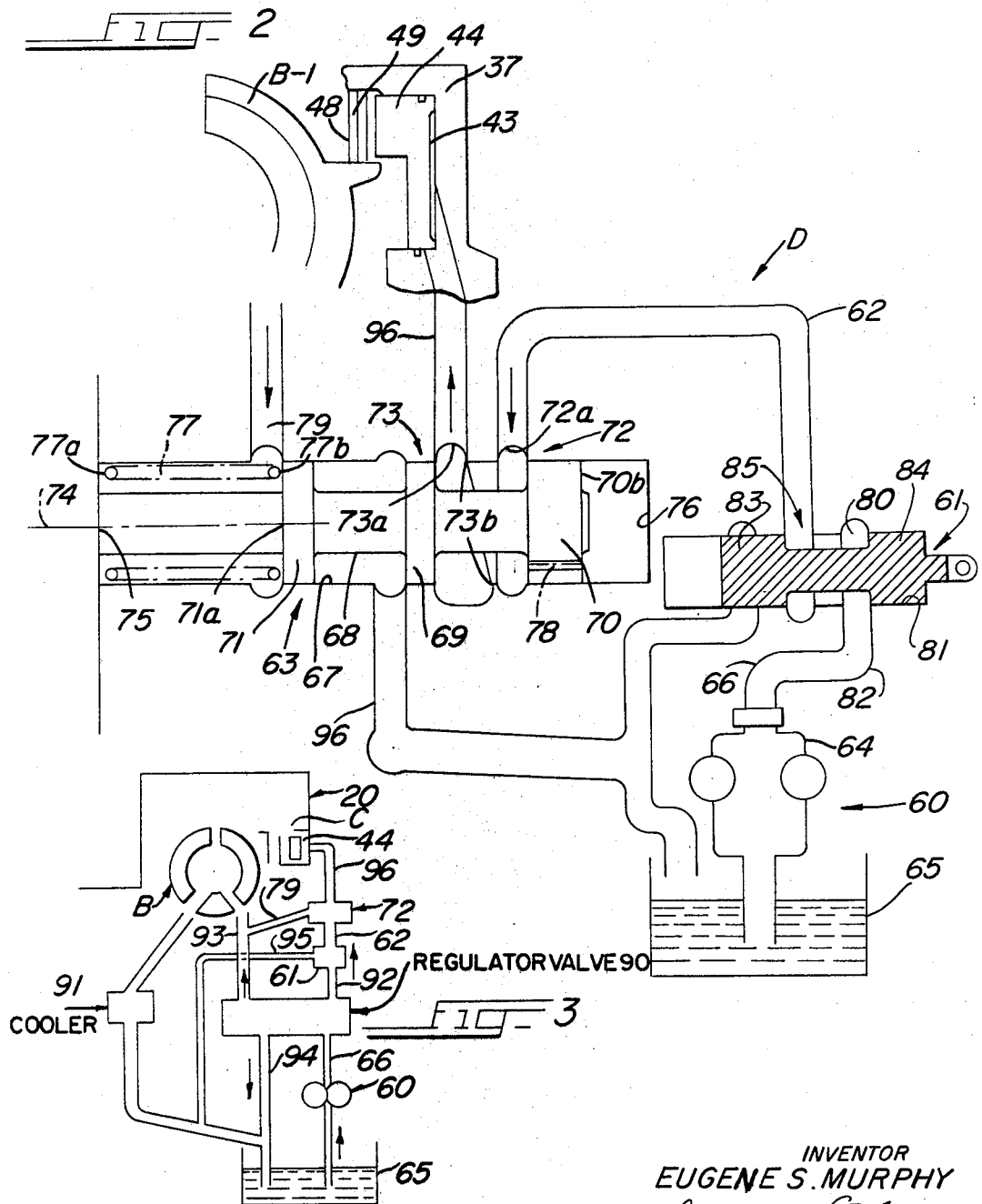

3,384,209
MODULATED FLUID CLUTCH IN SERIES WITH FLUID COUPLING
Eugene S. Murphy, Rockford, Ill., assignor to Borg-Warner Corporation, Chicago, Ill., a corporation of Illinois
Filed Mar. 24, 1966, Ser. No. 537,126
5 Claims. (Cl. 192—3.33)

ABSTRACT OF THE DISCLOSURE

A transmission mechanism includes a rotatable housing connected between a power source and a power take off. The impeller portion of a hydrokinetic torque converter is coupled to the housing in parallel with the power take off by means of a hydraulically actuated friction clutch which may be operated as a slipping clutch, if desired, for varying the ratio of power delivered to the torque converter and power take off.

---

This invention relates to a transmission mechanism and more particularly to an arrangement for selectively disconnecting or controlling the power flow, at some reduced value, to a hydrokinetic torque converter which in turn is connected to a load.

Heretofore, in particularly heavy duty vehicular applications, it has been advantageous to design torque converters with rotating fluid housings that provide the rotative drive to the pumping element of the torque converter. This is desirable for many reasons, among which is the reduction of fluid sealing problems and simplification of internal mounting structure. However, there is an increasing number of applications which have need for selective disconnection or partial disconnection of the rotary drive to the torque converter. Complete disconnection is required in those instances where shock is encountered in changing gears within a mechanical gear train associated in series with the torque converter. Partial disengagement is desirable to control or vary the torque absorption by the torque converter in those applications which have a split power train, the torque converter being disposed in one of the power paths.

A serious difficulty encountered in prior art suggestions, which have incorporated disconnect clutches, is the arrangement of the clutch so that it breaks the driving connection to the driving housing while maintaining a positive connection between the housing and the pumping element of the torque converter. This results in the relatively large inertial mass of the housing inducing a continued operation of the torque converter even after it is desired to shunt such power flow. Thus, incorporation of extended structure such as brakes and separate clutch controls is necessary to alleviate this problem. It is a primary object of this invention, therefore, to provide an improved and a much more simplified mechanism having a disconnect clutch which can be employed with a rotating housing and yet eliminate the housing inertia from the torque converter upon disconnection.

It is another object of this invention to provide an improved disconnect clutch for a torque converter, the disconnect clutch being applied with a force controlled in response to the static fluid pressure with which the torque converter is charged.

Still another object of this invention is to provide a control for a hydraulically actuated disconnect clutch used with a torque converter, the control being sensitive to flow restrictions downstream of the converter in the system so that a predetermined differential will be maintained between the actuating or apply fluid for the clutch and the converter charging pressure to assure adequate clutch engagement during the torque conversion range of operation and also improve the life of fluid seals used therewith by maintaining the necessary clutch apply pressure at a minimum value.

Still another object of this invention is to provide a transmission mechanism incorporating a hydraulically actuated disconnect clutch which may be controlled to provide varying degrees of slip between the input and output of the clutch and thereby control the torque absorption of the torque converter, the clutch plates being disposed in the converter fluid system without the need for extra equipment.

Yet still another object of this invention is to provide a mechanism incorporating a hydraulically actuated disconnect clutch which employs a servo-motor disposed within a surrounding housing providing rotary drive to the torque converter, the servo-motor having a pressure element with one surface subject to fluid pressure within the rotating housing providing a retracting function for said element when the clutch apply pressure is dissipated.

Other objects and advantages of this invention will become more apparent from the following detailed description taken in connection with the accompanying drawings in which:

FIGURE 1 is a fragmentary central sectional view of a transmission mechanism embodying the principles of this invention;

FIGURE 2 is a schematic illustration of a portion of the hydraulic control for the mechanism of FIGURE 1; and FIGURE 3 is a more general schematic illustration of the hydraulic control.

Turning now to the drawings, there is illustrated in FIGURE 1 a preferred embodiment of this invention which broadly comprises a rotary input means A, a hydrokinetic device B, a fluid actuated means C (disconnect clutch) for selectively providing a driving connection between the rotary input means and the impeller B-1 of the torque converter. Control means D illustrated in FIGURE 2, is effective to control the engagement of fluid actuated means C.

More particularly, the rotary input means A comprises a splined wheel 15 (which receives rotary power from a source such as a diesel engine) and is drivingly coupled to a hub 16, the hub being rotatively journalled by a bearing 17 received in the front wall 18 of a fixed enclosure 19. A rotatable shell 20 is formed of cast members 20a and 20b and, provides a fluid housing for the torque converter. Shell 20 is positioned within the enclosure 19 and has forward portion 20a thereof drivingly coupled to the hub 16 for rotation therewith; the rear portion 20b is journalled about the central shaft assembly 21 which in turn is journalled by a bearing 22 in the rear wall 14 of enclosure 19. Shell or housing 20 is adapted to provide a rotating fluid enclosure for the elements of the torque converter B; the torque converter B comprises typical bladed elements including the impeller B-1, a turbine 23, and a stator 24, the elements being arranged to define a toroidal fluid chamber 25 for circulating a fluid medium.

The shaft assembly 21 comprises a central driven shaft 26 provided with a hub 27 splined to the forward portion thereof, the hub being coupled to the turbine 23; the hub has a sleeve portion 27a journalled in a bearing 28 received in the hub 16. The central driven shaft 26 extends through bearing 22 and has a yoke 29 for connection to a suitable load such as the driving wheels of a tractor. A sleeve shaft 30 is mounted about the central shaft 26 and is fixed to the enclosure 19; the impeller B-1 has a hub 31 rotatably journalled by bearings 32 on sleeve shaft 30. The stator 24 has a hub 34 splined to the forward portion of the sleeve shaft and is positioned between thrust bearings 35 and 36 which separate the hubs 27 and 31 therefrom.

The fluid actuated means or disconnect clutch C comprises driving and driven portions 41 and 46 respectively and a servo-motor 33 effective to engage a plurality of interleaved discs 48 and 49 in cooperation with a backup ring 50. The servo-motor 33 is defined by a stepped wall portion 37 in the aft section 20b of the rotatable fluid housing 20. The stepped wall portion 37 terminates in a central opening 38 which receives a shoulder of the sleeve shaft 30. The stepped wall portion has an interior cylindrical surface 39 forming the outer wall of a servo-motor chamber 43; a radially directed interior wall 40 serves as the end wall thereof. The driving portion 41 of the clutch is formed as a drum coupled to the fluid housing 20 by suitable fasteners 51 and has a radially outer surface 42 serving as the inner cylindrical wall of the chamber 43. A pressure or piston element 44 is slidable in the chamber 43 along surfaces 39 and 42; the element 44 is actuated by apply fluid pressure to be moved in a left-hand direction (as viewed in FIGURE 1). The discs 48 and 49 have keys or splined portions 48a and 49a for providing a respective rotary driving connection to the input and output portions of the clutch while permitting axial movement during stacking or clamping under the influence of the pressure element 44. The entire clutch is generally concentric about the central axis 45 of the transmission mechanism.

From the above structural arrangement, it can be seen that the particular disposition of the clutch results in several advantages: (a) the fluid with which the rotatable housing 20 is filled serves also to bathe the discs 48 and 49 for cooling purposes particularly during clutch slippage. Such cooling can be gained without the need for separate and distinct apparatus thereby making greater use of the singular control circuit necessary for operation of the torque converter; (b) the static pressure of the fluid exterior of the torque converter elements and within the rotating housing 20 can be used also as a means for retracting the pressure element 44 upon dissipation of the clutch apply fluid pressure. Thus, the need for extra retracting springs or other structure is obviated.

In addition, improved nesting of the housings, converter and clutch provide greater structural simplicity. The fixed housing has a forward opening 18a and a rear sleeve 30 carrying a nested rotatable housing 20 therein by balanced bearings at the forward hub or sleeve 16 and rear opening of drum 41. The shaft assembly 21 is mounted by balanced bearings, one against the forward hub or sleeve of the housing 20 and the other against the rear sleeve 30 of housing 19. The impeller is mounted with twin bearings 32 on sleeve 30 to stabilize against tilt relative to the axis of rotation 45.

Turning now to FIGURE 2, there is illustrated a control system or means D which broadly comprises a source of fluid pressure 60 communicating with the clutch apply chamber 43 at a first predetermined pressure and communicating with the torque converter chamber 25 at a second predetermined pressure, said predetermined pressure being regulated by a multiple stage regulator means 90. The fluid pressure is selectively placed in communication with the clutch apply chamber 43 by a manual control valve 61 and an automatic control valve 72 regulates the ultimate communicated pressure at a differential with the converter charging pressure. The return or downstream line of the torque converter leads back to sump, and has interposed therein a cooler 91 which constitutes an inherent restriction in the flow line.

Turning now in particularity to the components of the control system, the fluid pressure source 60 may comprise a typical gear pump 64 which draws fluid from a sump 65, the pump outlet 66 being connected to the regulator means 90. The regulator means may be of typical construction employing a cascade arrangement of regulator valves, the first predetermined pressure which is regulated is communicated by way of conduit 92 with the manual selector valve 61 and the second stage of regulated pressure is communicated by conduit 93 with the inlet side of the torque converter chamber 25. Return to sump is provided by a line 94 which receives the overflow from the regulator means.

The manual control valve 61 has two purposes, first to select the on and off application of the disconnect clutch and, secondly to provide infinite degrees of slip of the discs 48 and 49 thereby providing a variable power flow between the housing and torque converter resulting in a reduced torque absorption thereby. To this end, the manual control valve 61 may comprise a valve cylinder 81 within which is slidably disposed a spool valve member carrying a pair of spaced lands 83 and 84. The conduit 66 connects with the cylinder 81 by way of a fluid inlet 82 and a fluid outlet 85 is provided communicating with a conduit 62 leading to automatic control valve 72. The inlet and outlet, 82 and 85, are spaced apart an axial distance such that they will be in full fluid communication when the valve member is in the position, as shown in FIGURE 2, with the lands respectively spaced on opposite sides of the fluid inlet and outlet. Another conduit 95 communicates another axial position of the cylinder 81 with the sump which is progressively closed and opened by land 83 for determining the degree of spill-off of pressure to the automatic control valve.

The use of the manual control valve as a slip control is particularly useful in split power train transmissions such as that shown in FIGURE 1. The first power path being normally from the housing 20 through the clutch C, to the torque converter B and ultimately to the output shaft 26; another power path may be through an annular gear 55 coupled to the rear portion 20b of the rotating housing, the gear 55 being in mesh with the spur gear 56 which in turn is carried by a gear reduction unit 57 mounted in the fixed housing 19. The unit 57 may, in the alternative, comprise a hydraulic pump for operation of an earth moving bucket, the pumps being substituted for the gear reduction unit. By control of the manual valve 61, the available horsepower from the engine may be more efficiently utilized in instances where the bucket must be moved relatively rapidly requiring a substantial amount of the total available horsepower. If the torque absorption by the torque converter is reduced, the bucket pumps will not be sluggish and thereby permit more selective accommodation to the needs of the operator.

The automatic control valve 63 is effective to provide two functions: first, it provides for a timed delay of pressure build-up within the clutch actuating chamber 43, and secondly, it maintains a predetermined pressure differential between the charging pressure of the converter and the clutch apply pressure so that the operating life of fluid seals may be enhanced. Pursuant to this, the automatic valve 63 comprises a cylindrical valve chamber 67 having end walls 75 and 76, the chamber being defined about a center line 74. A slidable valve member 68 is positioned within the cylinder 67 and has a plurality of lands 69, 70, and 71. Lands 69 and 70 are spaced apart an axial distance such that there may be full fluid communication between the fluid inlet 72 and the fluid outlet 73 (as shown in FIGURE 2). The fluid inlet 72, in part, comprises an annular groove 72a and the fluid outlet 73, in part, comprises an annular groove 73a, each groove being defined in the wall of the cylinder 67. Groove 73a has a biased edge 73b, viewed with respect to the center line 74, such that axial movement of the land 69 to the right (as viewed in FIGURE 2) will provide a progressive closing of the communication between the fluid inlet and outlet when the valve member 68 is moved fully to the right, and thereby avoid an abrupt closing.

The valve member 68 is normally biased to a right-hand position (the closed condition of the valve) by a resilient coiled spring 77 having one end 77a acting against end wall 75 of the cylinder and an opposite end 77b acting against a surface 71a carried by land 71.

To provide for opening of the automatic valve, fluid is admitted through inlet 72 from the manual valve and passed through a restricted orifice 78 in land 70 to the head of the cylinder 67; pressure builds up in the cylinder head acting against surface 70b in opposition to the coiled spring 77 and thereby moving the valve member to the left enabling land 69 to uncover the fluid outlet 73. A time delay is provided by proper dimensioning of the restricted orifice 78.

Pressure regulation of the fluid communicated to chamber 43 is provided by subjecting the charging pressure to the surface 71a of land 71. This is provided by conduit 79 which taps the fluid pressure at a point adjacent to the inlet to the converter thereby sensing the static pressure of the torque converter charging pressure. The charging pressure, acting against the area of surface 71a, assists the force of the resilient coiled spring 77 to oppose the higher clutch apply pressure acting against the area of surface 70b. Since the areas of the surfaces of 70b and 71a are generally equal, the pressure differential will be generally equal to the force of spring 77 divided by the surface area. Should the apply pressure exceed the predetermined differential, the conduit 96 will be slightly uncovered relieving the necessary excess of pressure.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

What is claimed is:

1. A transmission mechanism, comprising: a housing drivingly connected to a rotatable driving source; a hydrokinetic device disposed within said housing and employing a plurality of bladed elements rotatable about a common axis, one of said elements constituting a fluid impeller, said housing having a mass providing a substantially greater rotational inertia than the mass of said impeller; a disconnect clutch effective to provide a selective driving connection between said housing and impeller, said clutch being subject to fluid contained by said housing surrounding said hydrokinetic device, said clutch including means for hydraulic actuation thereof, said actuating means being subjected to the fluid pressure within said housing and to a clutch apply pressure, said clutch being disengaged by the pressure in the housing upon relief of the clutch actuation pressure.

2. A transmission mechanism, as in claim 1, said mechanism including a hydraulic system comprised of means for supplying fluid to apply said clutch at a first pressure, and means for supplying charging fluid to said device at a second pressure less than said first pressure, and means for sensing the static pressure of the charging fluid for maintaining a predetermined differential between said first and second pressures.

3. A transmission mechanism, as in claim 1, which comprises a fixed housing having a front wall provided with a central opening and a rear wall provided with a centrally disposed sleeve extending inwardly of the fixed housing; said rotatable housing being nested within said fixed housing and having a rear wall provided with a central opening, between the fixed housing sleeve and said rotatable housing rear wall opening is disposed a bearing, said rotatable housing having a front wall provided with a sleeve extending through the opening of said fixed housing front wall; a pair of adjacently disposed bearings mounted on said fixed housing sleeve for rotatably supporting said impeller; and a shaft assembly driven by said hydrokinetic device having a forward portion rotatably mounted within the rotatable housing front sleeve and a rear portion rotatably mounted within the fixed housing sleeve.

4. A transmission mechanism as in claim 3, in which said hydraulic system comprises an automatic regulator valve operable in response to differential pressures acting upon opposite surfaces thereof, said automatic valve having a first surface subject to said first fluid pressure tending to urge said valve to an open position for fully communicating fluid to said clutch, and said valve having a second surface subject to said second fluid pressure tending to close said valve, said valve further having a resilient means for maintaining a predetermined pressure differential between said first and second pressures.

5. A transmission mechanism, as in claim 1, in which said mechanism has first and second power paths each deriving rotative power from said housing, said first power path having said hydrokinetic device and said clutch interposed therein; and a hydraulic system employing a manual valve for varying the degree of fluid pressure communicated to said clutch for providing a partial engagement thereof whereby the torque absorption by said first power path may be varied to permit increases or decreases of power transmitted to said second power path.

References Cited
UNITED STATES PATENTS

| | | | |
|---|---|---|---|
| 2,453,811 | 11/1948 | Pennington | 192—3.21 |
| 3,019,670 | 2/1962 | Kelley | 192—3.33 X |
| 3,109,524 | 11/1963 | Howard | 192—3.33 |
| 3,202,018 | 8/1965 | Hilpert | 192—3.33 X |

BENJAMIN W. WYCHE III, *Primary Examiner.*